United States Patent
Dollinger et al.

(10) Patent No.: US 8,662,043 B2
(45) Date of Patent: Mar. 4, 2014

(54) ASSEMBLED SHAFT ELEMENT, PARTICULARLY ASSEMBLED CAMSHAFT FOR VALVE-CONTROLLED INTERNAL COMBUSTION ENGINES

(75) Inventors: Peter Dollinger, Ingolstadt (DE); Thomas Schimmer, Ingolstadt (DE)

(73) Assignee: Audi AG, Ingolstadt (DE)

( * ) Notice: Subject to any disclaimer, the term of this patent is extended or adjusted under 35 U.S.C. 154(b) by 82 days.

(21) Appl. No.: 13/377,355

(22) PCT Filed: Jun. 8, 2010

(86) PCT No.: PCT/EP2010/003412
§ 371 (c)(1), (2), (4) Date: Dec. 9, 2011

(87) PCT Pub. No.: WO2010/142408
PCT Pub. Date: Dec. 16, 2010

(65) Prior Publication Data
US 2012/0079913 A1    Apr. 5, 2012

(30) Foreign Application Priority Data
Jun. 10, 2009   (DE) .......................... 10 2009 024 455

(51) Int. Cl.
F01L 1/04 (2006.01)
(52) U.S. Cl.
USPC ...................... 123/90.6; 123/90.16; 29/888.1
(58) Field of Classification Search
USPC .............................. 123/90.6, 90.16; 29/888.1
See application file for complete search history.

(56) References Cited

U.S. PATENT DOCUMENTS

| 4,719,682 | A | * | 1/1988 | Santi ............................. 29/893.1 |
| 4,903,543 | A | * | 2/1990 | Matt ............................... 74/567 |
| 4,947,547 | A | | 8/1990 | Matt |
| 8,365,692 | B2 | * | 2/2013 | Schoeneberg et al. ..... 123/90.18 |
| 2010/0224145 | A1 | | 9/2010 | Mueller |

FOREIGN PATENT DOCUMENTS

| DE | 35 25 186 A1 | 1/1987 |
| DE | 37 17 190 A1 | 12/1988 |
| DE | 197 10 847 C2 | 9/1998 |
| DE | 10 2005 020 236 A1 | 11/2006 |
| DE | 10 2007 010149 A1 | 9/2008 |
| EP | 0 340 128 A1 | 11/1989 |
| EP | 1 741 945 A1 | 1/2007 |
| EP | 1 900 951 A1 | 3/2008 |
| JP | 11 108070 A | 4/1999 |

OTHER PUBLICATIONS

Karl-Heinz decker: "Maschinenelemente: Gestaltung and Berechnung", 8th Edition, Muenchen/Wien, Carl Hanser Publisher, 1982, p. 22, Table 2.10.

* cited by examiner

Primary Examiner — Ching Chang
(74) Attorney, Agent, or Firm — Henry M Feiereisen LLC

(57) ABSTRACT

The present invention relates to an assembled shaft element, in particular an assembled camshaft for valve-controlled internal combustion engines, wherein a hub body having at least one functional part, in particular at least one cam, is held on a shaft by a formfit connection using a splined tooth system in the circumferential direction, wherein the splined tooth system includes shaft splines formed on the shaft and interacting with hub body splines formed in a hub body recess. According to the invention, the at least one hub body (14) is held in addition to the circumferential formfit connection by an interference fit on the shaft (12) implemented by a press fit between a tooth circle of the shaft splines (22) and a root circle of the hub body splines (26). The invention further relates to a method for producing an assembled camshaft for valve-controlled internal combustion engines.

23 Claims, 2 Drawing Sheets

ASSEMBLED SHAFT ELEMENT, PARTICULARLY ASSEMBLED CAMSHAFT FOR VALVE-CONTROLLED INTERNAL COMBUSTION ENGINES

CROSS-REFERENCES TO RELATED APPLICATIONS

This application is the U.S. National Stage of International Application No. PCT/EP2010/003412, filed Jun. 8, 2010, which designated the United States and has been published as International Publication No. WO 2010/142408 and which claims the priority of German Patent Application, Serial No. 10 2009 024 455.7, filed Jun. 10, 2009, pursuant to 35 U.S.C. 119(a)-(d).

BACKGROUND OF THE INVENTION

The invention relates to an assembled shaft element, in particular an assembled camshaft for valve-controlled internal combustion engines, and to a method for making an assembled shaft element.

For internal combustion engines with variable valve control and/or shut down of individual cylinders, structures are known having cams or cam pairs that are axially movable on the shaft and which, for example, carry two different cam contours per poppet valve and thus cause different control times when being switched. If one of the contours has a circular symmetry (cam base circle), the poppet valve can also be shut down. When combining such "switching cams" with non-switchable fixed cams, both variants have to be built as assembled version for mounting reasons alone, for example via a splined tooth system, which is easy to mount while ensuring a reliable transmission of the drive torque and an adequate support of the occurring alternating torques. Since for example such a splined tooth system has play, significant noise emissions can occur during engine operation. These noise emissions are caused in particular by the alternating torque which acts on the splined tooth system and is caused for example by valve and pump cams.

DE 197 10 847 C2 and DE 37 17 190 A1 both already disclose to push cam-bearing hub base bodies onto a shaft in a material-removing manner. Such a connection however, has the disadvantage that the chip formation decreases the transmittable torque, because material is broken out of the joining gap and can therefore no longer contribute to the formfit or the tension build up and thus to the force fit.

To avoid the latter, EP 1 741 945 A1 proposes to form a hub body recess that has a circular cross section and an absolutely smooth recess surface. The shaft which is to be connected to the hub body is widened in the connection area by a special knurling process to such a radius that elevations and depressions form on the outside of the shaft. To connect the two components, the hub body is pushed over the area of the shaft which has been widened by the knurling process and thus forms a force-fitting and formfitting connection with the shaft. This shaping however poses the risk of formation of cavities and thus tension losses which in turn can adversely affect the formfit and/or force fit between the shaft and the hub body.

SUMMARY OF THE INVENTION

It is therefore an object of the invention to propose an assembled shaft element, in particular an assembled camshaft, which is simple in structure and yet reliably avoids an unwanted noise emission during operation of the shaft. Further, it is an object to provide a method with which a technically simple production of an assembled shaft is possible.

This object is solved with the features of the independent claims. Advantageous and useful embodiments of the invention are subject matter of the sub-claims.

According to the invention, an assembled shaft element, in particular an assembled cam shaft for valve-controlled internal combustion engines, is proposed, having at least one functional part, in particular at least one cam, to formfittingly hold the hub body on a shaft in circumferential direction by a formfit connection, using a splined tooth system which includes shaft splines formed on the shaft for engagement with hub body splines formed in a hub body recess. According to the invention, in addition to the circumferential formfit connection, the at least one hub body is held on the shaft by an interference fit which is realized by a press fit between a tip circle of the shaft splines and a root circle of the hub body splines.

Besides the fact that such an arrangement according to the invention eliminates the need for axial securement of the hub body on the shaft, alternate torques occurring during shaft operation are, particularly advantageously, supported very well and absorbed by the tooth system so that unwanted sound emissions are eliminated or reduced significantly.

Especially advantageous and favorable with regard to manufacture, the interference fit can be realized by increasing the tip circle diameter of the shaft splines relative to a nominal dimension and/or decreasing the root circle diameter of the hub body splines relative to this nominal dimension. As a result, the tooth tips of the splines on the shaft and the tooth roots of the splines on the hub body in opposite relationship without contacting each other are configured such that their cooperation results in the mentioned interference fit. The alterations on the splines and the additional effort with regard to manufacturing can be realized in a most simple manner and with little effort.

In particular, the splines can be implemented on the shaft and on the hub body by grounding the tip circle diameter to fit and to broach the root circle diameter to fit. Preferably, the splines with interference fit are hereby manufactured to a press fit in a transition-fit near region, in particular manufactured with a smaller overlap (preferably to H7/r6 or H7/s6 or H7/u6) than a shaft-hub-connection which is configured without splined tooth system, for example one which is connected by a material-removing process and transmits a same operating torque. The relatively small overlap ensures easy assembly and guarantees that the hub bodies which already have been prefabricated precisely to size suffer no subsequent deformation; still a sufficient support of occurring alternate torques is ensured during operation particularly during cam operation.

For especially easy assembly when joining the hub bodies in a press fit and in the longitudinal press fit, the corresponding splines on the shaft can have a slanted run-on surface to facilitate sliding onto the splines. Preferably, this sliding is carried out in combination with a suitable lubricant or separation agent, which can be water-based or oil-based to avoid seizing and thus damage to the hub body or the hub body splines during assembly, when sliding such interference-fit shaft areas or shaft sections over each other, which have identical interference fit dimension as an interference-fit shaft area which is assigned to and in sliding direction positioned behind a hub body that is to be slid on.

Alternatively, when joining in the transverse press fit, the shaft can be cooled and/or the hub body heated to the extent that the hub body can be pushed onto the shaft or splines substantially without force. These afore-described mounting aids have the additional advantage that in hub body arrangements which alternate between interference fit and sliding fit, the hub bodies that are to be joined can be pushed easily over several splines which precede the hub body in order, for example via a sliding fit according to claim 8 and here in particular in combination with interference-fit hub body connections and sliding-fit hub body connections that have substantially the same or essentially uniform toothing parameters. Uniform toothing parameters relate hereby in particular to approximately same dimensions and arrangements of the respective spline areas.

According to the procedure of the invention according to claim 10, it is provided in particular that the tip circle of the shaft splines is manufactured round in particular ground round, with a tolerance of maximally 20 μm, preferably of maximally 6 μm, most preferably of maximally 13 μm. According to this procedure according to the invention, the root circle of the hub body splines is also manufactured round, in particular broached round, preferably with a tolerance of max. 25 μm, preferably of 21 μm, most preferably 17 μm. With a mode of production involving such fine tolerance, an assembled camshaft can be manufactured that satisfies the afore-mentioned conditions in a superior manner. The tip circle of the shaft splines and the root circle of the hub body splines are hereby manufactured preferably with a same nominal dimension or configured with regard to a same nominal dimension.

BRIEF DESCRIPTION OF THE DRAWING

An exemplary embodiment of the invention will now be described in greater detail with reference to the attached schematic drawings. It is shown in.

DETAILED DESCRIPTION OF PREFERRED EMBODIMENTS

Figure 1:
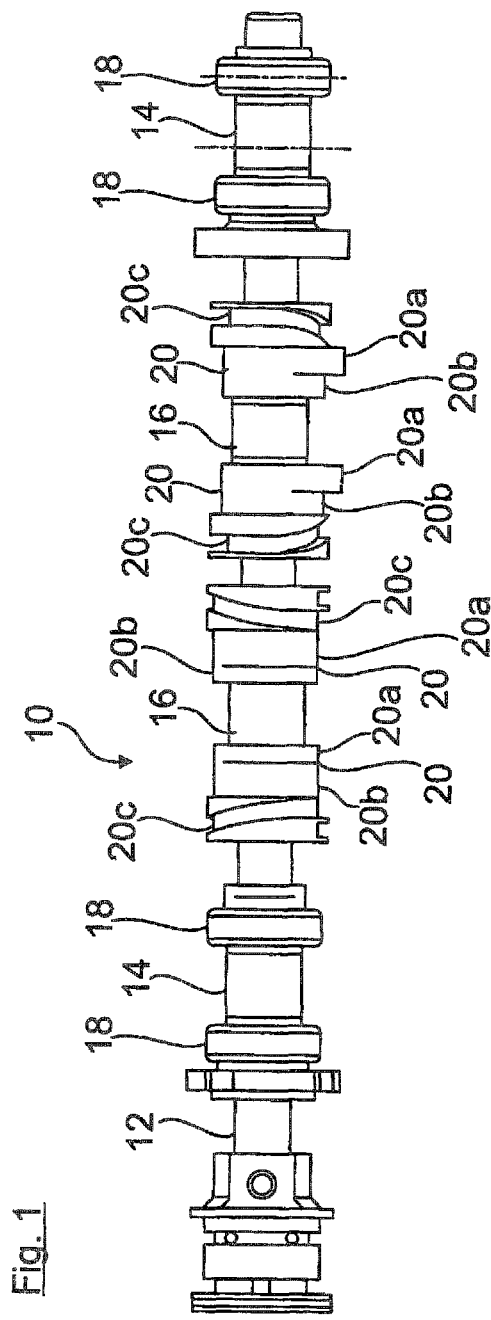
FIG. 1 a camshaft for internal combustion engines with partial cylinder shut down, here exemplary with four hub bodies which are arranged on splined tooth systems and have cam pairs, of which, again merely exemplary, two are configured with interference fit and two are configured slideably with sliding fit, FIG. 2 an exploded view of a section of the camshaft according to FIG. 1 with two splined tooth systems and two hub bodies, which are mountable on the shaft with an interference fit and a sliding fit, FIG. 3 an enlarged illustration of a tooth engagement of the splines for the moveable hub bodies on the shaft, and FIG. 4 also an exploded view of the tooth engagement of the splines of the other hub body of FIG. 2 with interference fit on the shaft.

FIG. 1 shows a camshaft 10 for an internal combustion engine with partial cylinder shut down which substantially includes an inner shaft 12 which can be driven by a drive gear (for example chain wheel, not shown) and on which i.a. four cam pairs 18, 20 are arranged which are formed on hub bodies 14, 16. The camshaft 10 is described only to the extent necessary for the understanding of the present invention.

The cam pairs 18 on the hub bodies 14 are simple fixed cams, each operating a poppet valve of the valve train of the internal combustion engine.

The middle cam pairs 20 are switch cams which are fixed on the hub bodies 16 and respectively have a cam contour 20a and a circular symmetrical contour 20b matching the cam base circle. Further, sliding guides 20c are assigned adjacent to the cam pairs 20 for allowing the cam pairs 20 with the hub bodies 16 to move axially. A switch pin which is not shown engages hereby alternatingly into one or the other sliding guide 20c.

Figure 2:
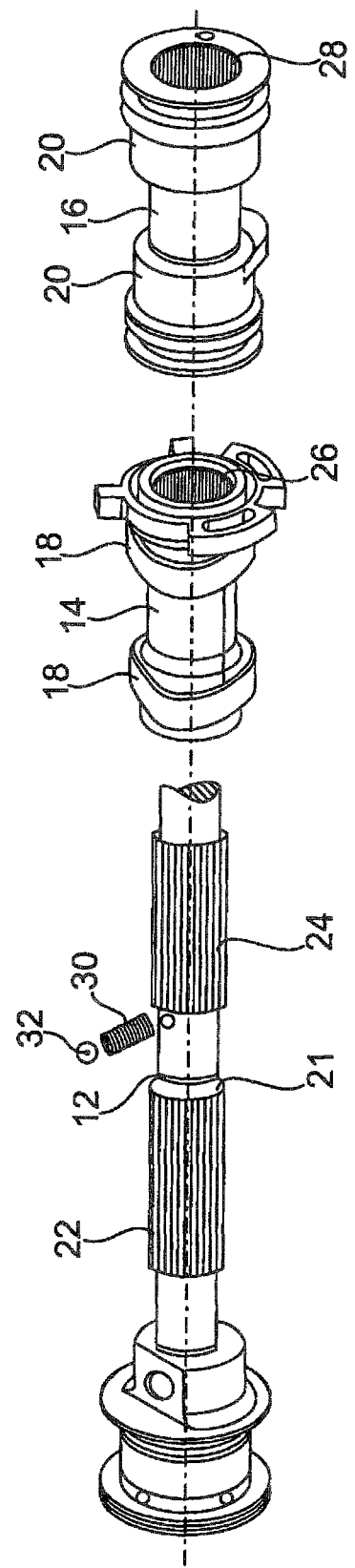

For each cam pair 18, 20 with their hub bodies 14 16, axially parallel oriented splines 22, 24 (compare FIG. 2) are incorporated on the shaft 12 of the camshaft 10 and engage with corresponding splines 26, 28 in the hub bodies 14, 16 to interact in the form of splined tooth systems which are form-fitting in circumferential direction.

The splines 22, 26 for the two hub bodies 14 are hereby configured as press fit which still has to be described, so that the hub bodies 14 with their cams 18 after their joining are held on the shaft 12 with press fit and, La. need no further axial securement.

The splines 24, 28 for the two hub bodies 16 are configured as known splines according to DIN/ISO as sliding fit and allow an almost force-free sliding onto the shaft 12. In addition to the adjustment of the switch cams 20 with the hub bodies 16, locking bodies 32 are provided in the shaft and maintained under tension radially outwards by compression springs 30, which locking bodies in cooperation with corresponding depressions (not visible) in the hub bodies 16 lock the hub bodies 16 with the cam pairs 20 in the respectively switched axial position on the shaft 12.

Figure 3:
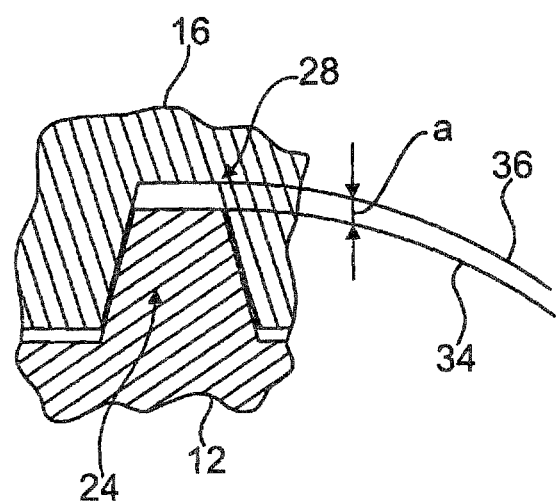

FIG. 3 shows the tooth engagement of the splines 24, 28 configured as sliding fit, wherein according to the typical toothing parameters a normal play (scale a) according to DIN/ISO is formed between the tips of the teeth (tooth tip circle 34) and the roots of the teeth (tooth root circle 36), respectively. The hub bodies 16 can thus be pushed onto the shaft 12 or its splines 24 almost without force, and correspondingly adjusted to adjust cam operation.

Figure 4:
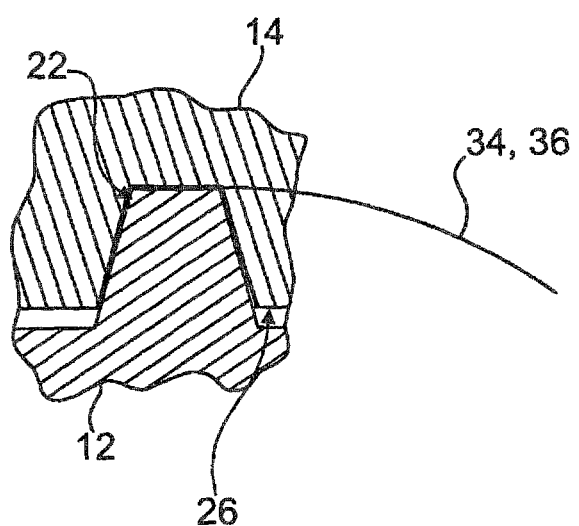

In contrast thereto, the tooth engagements (FIG. 4) of the splines 22, 28 are configured as press fit. For that purpose, the tip circle 34 of the splines 22 on the shaft 12 is manufactured at slight overlap with the tooth root circle 36 of the splines 26 in the hub body 14.

In the manufacture of the splines 22, 26, the splines 22 on the shaft 12 is first rolled out with a slightly larger tooth tip circle 34 and the tooth tip circle 34 is subsequently ground to a fit size (preferably u6).

in the splines 26 of the hub body 14, the corresponding tooth roots or their tooth root circle 36 respectively, are adjusted to the larger tooth tip circle 34 by a broaching needle, preferably with a fit size H7 (based on a common fit size, respectively). The relatively small overlap between tooth tip circle 34 and tooth root circle 36 is sufficient to secure the axial position of the hub body 14 on the shaft 12 and to support alternating torques occurring during cam operation without relative movements caused by tooth play.

For mounting the hub bodies 14 with the cams 18 onto the splines 22 of the shaft 12, the shaft 12 is cooled and at the same time the hub body 14 with the cams 18 is heated. Because of the small overlap with the fit H7/u6, the heating of the hub body 14 can be kept relatively low so that no warping or loss of hardness occurs on the cam pairs 18 which are already manufactured to fit. The hub bodies 14 (on the left side in the drawing FIG. 1) which are to be positioned first in mounting direction, can be easily pushed over the anteriorly lying splines 22 and 24 and after temperature equalization are locked in place between shaft 12 and hub body 14.

Instead of the transverse press fit (shrink on), the hub bodies 14 can also be configured on the splines 22 as longitudinal press fit. In this case the splines 22 can be provided with leading slanted run-on surfaces 21 (conical tapering), as viewed in mounting direction, to promote a threading of the hub bodies 14 onto the splines 22 of the shaft 12. Optionally, the slanted run-on surfaces 12 may also be formed on the internal splines 26 of the hub bodies 14. A possible seizing in the press fit can be safely avoided by using a suitable lubricant or separation agent (oil or water based).

The invention is not limited to the illustrated embodiment. Instead of the indicated press fit H7/u6, a different appropriate fit can be used.

Instead of cam pairs on the hub body, individual cams or a combination of individual cams and cam pairs can also be used, respectively. Further, other functional parts of the shaft 12 for example drive eccentrics, etc., can be fixed on the splines 22 of the shaft 12 with a press fit, as described above.

The switch cams 20 can also be configured such that instead of a cylinder shutdown, different cam contours are provided to achieve a variable valve control.

The invention claimed is:

1. A shaft assembly, comprising:
   a shaft having first and second shaft splines;
   a first hub body having a recess formed with first splines for formfitting engagement with the first splines of the shaft to define a circumferential formfit connection for holding the first hub body on the shaft; and
   a second hub body having second splines for engaging the second splines of the shaft by a sliding fit so as to be movable in an axial direction of the shaft, said first hub body being additionally held on the shaft by a press fit formed between a tip circle of the first splines of the shaft and a root circle of the first splines of the first hub body.

2. The shaft assembly of claim 1, constructed in the form of a camshaft for a valve-controlled internal combustion engine, said camshaft having at least one cam as a respective functional part of the first and second hub bodies.

3. The shaft assembly of claim 1, wherein the interference fit is realized in at least one of two ways, a first way in which the tip circle of the first splines of the shaft is defined by a diameter which is increased with respect to a nominal dimension, a second way in which the root circle of the first splines of the first hub body is defined by a diameter which is decreased with respect to said nominal dimension.

4. The shaft assembly of claim 1, wherein the diameter of the tip circle is ground to fit and/or the diameter of the root circle is broached to fit.

5. The shaft assembly of claim 1, wherein the first splines of the shaft and the first splines of the first hub body are manufactured to the press fit in a transition-fit near region.

6. The shaft assembly of claim 1, wherein the first splines of the shaft and the first splines of the first hub body are manufactured to the press fit in a transition-fit near region with an overlap which is smaller than an overlap of a shaft-hub connection which is formed without splines and transmits a same operating torque.

7. The shaft assembly of claim 6, wherein the overlap of the press fit is a fit selected from the group consisting of H7/r6, H7/s6 and H7/u6.

8. The shaft assembly of claim 1, wherein the first splines of the shaft are provided with a slanted run-on surface.

9. The shaft assembly of claim 1, further comprising a separating agent or lubricant provided in a joining gap formed when pushing the first splines of the first hub body over the first splines of the shaft.

10. The shaft assembly of claim 1, further comprising a shaft-side shift toothing configured such that the first hub body held on the shaft by the interference fit is slideable on the shaft with a defined play in relation to the shaft-side shift toothing.

11. The shaft assembly of claim 1, wherein the first hub body and the second hub body have essentially same or uniform toothing parameters.

12. The shaft assembly of claim 1, further comprising a locking mechanism for locking the first hub body on the shaft, said locking mechanism including a locking body provided in the shaft and engageable in a depression of the first hub body structure, and a compression spring to urge the locking body radially outwards.

13. A method for the manufacture of a shaft assembly, comprising:
    holding a first hub body on a shaft via a splined tooth system configured to establish a formfitting engagement between the shaft and the first hub body in a circumferential direction, and a force-fit engagement or press fit engagement in a radial direction between a tip circle of splines of the shaft and a root circle of splines of the first hub body;
    forming the tip circle of the splines of the shaft round with a first tolerance of maximally 20 μm; and
    forming the root circle of the splines of the first hub body round with a second tolerance of maximally 25 μm.

14. The method of claim 13, wherein the forming step of the tip circle includes grinding.

15. The method of claim 13, wherein the forming step of the root circle includes broaching.

16. The method of claim 13, wherein the first tolerance is maximally 15 μm.

17. The method of claim 13, wherein the first tolerance is maximally 13 μm.

18. The method of claim 13, wherein the second tolerance is 21 μm.

19. The method of claim 13, wherein the second tolerance is 17 μm.

20. The method of claim 13, wherein the tip circle of the splines of the shaft and the root circle of the splines of the first hub body are manufactured with a same nominal dimension.

21. The method of claim 13, further comprising providing at least one of the splines of the shaft and the splines of the first hub body with a slanted run-on surface.

22. The method of claim 13, further comprising joining the shaft and the first hub body in a transverse press fit in at least one of two ways, a first way in which the shaft is cooled, a second way in which the first hub body is heated, thereby allowing the first hub body to be pushed over the shaft substantially without force and/or with a defined play.

23. The method of claim 13, further comprising adding a separation agent or lubricant when joining the shaft and the first hub body in a longitudinal press fit to provide lubrication in a joining gap formed between the splines of the shaft and the splines of the first hub body.

* * * * *